United States Patent [19]

Roinestad et al.

[11] Patent Number: 5,004,097
[45] Date of Patent: Apr. 2, 1991

[54] REPLACEABLE SNAP-ON MODULAR OVERLAY FOR ROD AND LINK TURN-CURVE CONVEYOR BELTS

[75] Inventors: Gerald C. Roinestad, Williamsburg; Michael R. Straight, Winchester, both of Va.

[73] Assignee: Ashworth Bros., Inc., Fall River, Mass.

[21] Appl. No.: 472,062

[22] Filed: Jan. 30, 1990

[51] Int. Cl.$^5$ ............................................. B65G 17/42
[52] U.S. Cl. .............................. 198/803.01; 198/831; 198/852
[58] Field of Search ........... 198/831, 803.01, 850–853, 198/792, 334, 778

[56] References Cited

U.S. PATENT DOCUMENTS

| | | |
|---|---|---|
| Re. 27,690 | 7/1973 | Roinestad et al. . |
| 1,376,449 | 5/1921 | McKenzie . |
| 2,703,644 | 3/1955 | Van Lake . |
| 2,792,928 | 5/1957 | Holz . |
| 2,872,023 | 2/1959 | Bechtel . |
| 3,225,898 | 12/1965 | Roinestad . |
| 3,261,451 | 7/1966 | Roinestad . |
| 3,333,678 | 8/1967 | Rodman . |
| 3,416,645 | 12/1968 | Jones . |
| 3,799,328 | 3/1974 | Harvey . |
| 3,920,117 | 11/1975 | Roinestad . |
| 3,977,514 | 8/1976 | Kaess . |
| 4,394,901 | 7/1983 | Roinestad . |
| 4,469,221 | 9/1984 | Albert . |
| 4,582,193 | 4/1986 | Larsson .................. 198/803.01 |
| 4,742,907 | 5/1988 | Palmaer . |
| 4,867,301 | 9/1989 | Roinestad, et al. . |
| 4,878,362 | 11/1989 | Tyree, Jr. . |
| 4,893,710 | 1/1990 | Bailey, et al. . |

OTHER PUBLICATIONS

"An Introduction to Small Radius Omniflex ® and Small Radius Omni-Grid ®" by Ashworth Bros., Inc., Bulletin No. SR80 (Rev. 8/83).

*Primary Examiner*—Joseph E. Valenza

[57] ABSTRACT

An overlay for use in a conveyor system having at least one ware transport section and made up of a succession of overlays for transporting articles, wherein each overlay is supported and moved along by a belt of spaced rod members extending transversely of the direction of travel of the belt which slides upon at least one rail. Each overlay includes a upper overlay surface upon which articles are supported. The upper overlay surface has an overlay leading portion with a leading edge and a trailing portion with a trailing edge. The overlay is provided with a forward support means which are removably attached to an attachment rod member, an anti-tipping means for preventing the overlay from pivoting about the attachment rod member out of the plane of the belt while the overlay travels through the transport section of the conveyor system, and, optionally, if the belt is to travel through an arcuate path about an axis parallel to the plane of the belt or through a vertical path, an anti-rotation means for preventing the overlay from pivoting about the attachment rod member while travelling through such an arcuate path or such a vertical path. The overlay trailing portion extends over a trailing rod member of the belt and cooperates with the forward support means to maintain the overlay in a horizontal position while in the transport section of the conveyor system and the rod members are parallel to each other.

8 Claims, 9 Drawing Sheets

REPLACEABLE SNAP-ON MODULAR OVERLAY FOR ROD AND LINK TURN-CURVE CONVEYOR BELTS

FIELD OF THE INVENTION

This invention relates to conveyor belts and, more particularly, to ware-supporting attachments releasably attached to and extending between spaced rod members which extend transversely of the direction of travel of a collapsible-link conveyor belt and a method of assembly and retention of the individual attachments to the conveyor belt. The ware-supporting attachments impart only minimal tensile loads to the supported ware and moreover do not allow ware of small size to become trapped in the attachment.

BACKGROUND OF THE INVENTION

Conveyor apparatus are widely used in a great variety of industrial fields as part of automated machinery for transporting products or work pieces from one location to another automatically and repetitively with minimal operator control or observation. It is thus important that the conveyor construction be durable and reliable, and if damaged, easily and quickly repairable with readily available parts. Such conveyors in the past have employed chains or collapsible rod and link conveyor belts to which individual ware-supporting attachments are attached. The collapsible rod and link conveyor belt has a conveying surface of open-frame construction formed by spaced rods in generally parallel relationship and extending transversely to the direction of motion of the belt. Typically, the rods are interconnected by two parallel rows of links at the extreme edges of the belt and thus at the opposite ends of the rods.

The present invention is particularly adapted for use in such collapsible rod and link conveyor belts. An example of such a conveyor belt is shown in U.S. Pat. No. 3,225,898 to Gerald C. Roinestad, entitled "Collapsible Conveyor Belt." The conveyor belt of the Roinestad U.S. Pat. No. 3,225,898 includes a supporting surface comprising a plurality of transverse rods and a link construction which enables the conveyor belt to travel through an edgewise arcuate path in the plane of the belt as well as an arcuate path about an axis parallel to the plane of the belt. Chain conveyors typically do not lend themselves to situations requiring the conveyor belt to travel through an edgewise arcuate path in the plane of the belt, for example, a long helical path which requires the inner portion of the belt to collapse upon itself and/or the outer portion of the belt to expand as the belt travels such a path.

Numerous attachments have been used on conveyor apparatus to provide a supporting surface for the wares carried thereon. Non-collapsing attachments are disclosed for conveyors utilizing rods in U.S. Pat. Nos. 1,376,449 (grated support surface); 3,799,328 (grated support surface); 3,977,514 (continuous support surface); and 4,469,221 (grated support surface); and for conveyors utilizing chains in U.S. Pat. No. 4,582,193 (continuous support surface). Collapsing attachments are disclosed for collapsible rod and link-type conveyors in U.S. Pat. Nos. Re. 27,690 (grated support surface); 2,872,023 (grated support surface); 3,261,451 (grated support surface); 3,333,678 (continuous support surface); 3,416,645 (continuous support surface); and 4,394,901 (continuous support surface).

The prior art attachments which provide a collapsible continuous support surface disclose attachments which meet one another along lines generally perpendicular to the direction of relative motion between collapsing attachments when travelling the straight portion of the conveyor. Subsequent expansion and collapsing of the various portions of the respective attachments relative to one another when the conveyor belt travels through an edgewise arcuate path in the plane of the belt imparts tensile forces across a similar line in an article resting upon at least two of such attachments. If the article is pliable or lacks sufficient cohesive strength, for example, a hamburger pattie, undesirable distortion or disassociation of the article may occur resulting in a non-acceptable product for market. Such attachments are considered herein to be tensioning attachments.

The prior art attachments which provide a collapsible grated support noted above are all of a flattened helix of wire. In such conveyor systems, when the belt collapses, the loops of one helix nest between the loops of the next helix. Subsequent expansion of two collapsed attachments under a common article imparts a series of minute shear forces across the article. The likelihood of distortion in the article is less as compared with prior art attachments providing a collapsible continuous support surface. Such attachments are considered herein to be non-tensioning attachments.

Problems associated with the use of flat helical mesh woven onto collapsible rod and link conveyor belts (grid belts) frequently have centered upon the inherent existence of a cavity or hole within each helix, formed by the opposing flat faces of the helix and the connective members extending through the end portions of such flat helixes. In belt structures having such cavities within the helix, it is possible for a relatively small diameter elongated item, e.g., a green bean or a threaded fastener, to slip into such a cavity and become trapped, thus presenting an unsanitary condition or possibly damaging the belt. One technique for avoiding this problem has been the use of a more tightly wound helix to provide a finer mesh. This approach, however, consumes much greater amounts of wire for a belt of given dimensions and renders such a belt both more costly and heavier than desirable, requiring heavier components to support the belt and more power to operate it.

U.S. Pat. No. 3,920,117 issued to Roinestad discloses an attachment which is trap-free as compared to a flat helix, but the attachment is not collapsible. Other trap-free, non-collapsing attachments are disclosed in U.S. Pat. Nos. 3,799,328; 4,469,221; and 4,582,193. Though these are trap-free attachments, they are also tensioning attachments.

A further problem associated with the non-tensioning attachments of the prior art is repair and/or replacement of a damaged or broken flat helix wire. Such a repair or replacement is not easily or readily accomplished. Considerable time and effort is required, resulting in an extended down-time period of the conveyor belt. The foregoing problem stems from the requirement that the flat helix wire be installed onto the rods of the belt prior to assembly of the belt in a given system.

Thus, there exists a need to provide a non-tensioning, trap-free ware-support attachment which can be used in conjunction with commercially available collapsible rod and link conveyor belts, and which is easily attachable and removable from an assembled belt without requiring complete disassembly of the conveyor belt system, the use of special tooling, nor specially skilled labor, while at the same time remaining securely fastened to the rods of the belt while in operation.

SUMMARY OF THE INVENTION

In a broad aspect of the invention, there is provided an overlay which is a non-tensioning, trap-free ware-support attachment for a collapsible rod and link conveyor system having a belt of spaced rod members extending transversely of the direction of travel of the belt and having at least one ware transport section. The conveyor system is made up of a succession of such overlays for transporting articles. Each overlay includes an upper overlay surface having leading and trailing portions with leading and trailing edges, respectively, and upon which the articles are supported. The overlay is provided with forward support means which are removably attached to an attachment rod member, an anti-tipping means for preventing the overlay from pivoting about the attachment rod member out of the plane of the belt while the overlay travels through the transport section of the conveyor system, and a trailing portion which extends over a trailing rod member of the belt while in the transport section of the conveyor system and the rod members are parallel to each other. If the belt is to travel through an arcuate path about an axis parallel to the plane of the belt or through a vertical path, the overlay also includes anti-rotational means for preventing the overlay from pivoting about the attachment rod member while travelling through such an arcuate path.

More particularly, there is provided an overlay for use in a conveyor system having at least one ware transport section and made up of a succession of overlays for transporting articles, each overlay being supported and moved along by a belt of spaced rod members extending transversely of the direction of travel of said belt which slides upon at least one rail, said overlay comprising:

an overlay body providing an upper overlay surface with leading and trailing edges and upon which said articles are supported; said overlay body comprising
  a backbone member extending transversely of the direction of travel of said belt when said overlay is installed, and
  a plurality of rib members attached to said backbone member, said rib members being substantially parallel to each other and transversely spaced from each other, each of said rib members having an upper rib surface and a rib leading edge and a rib upper trailing edge which define said upper overlay surface and said leading and trailing edges of said overlay body, respectively;

forward support means depending from said overlay body for supporting said overlay body on said spaced rod members;

said forward support means including a rod member engaging means operable to receive an attachment rod member when said overlay body is moved relatively toward said attachment rod member in a direction normal to said upper overlay surface;

said rod member engaging means including at least one pair of spaced resilient legs depending from said overlay body and each of said at least one pair of legs providing an opening for receiving said attachment rod member;

holding and bearing means in said opening on each pair of said legs for holding said attachment rod member received in said opening with a snap fit and providing bearing support for loads transmitted through said forward support means;

an anti-tipping means depending from said overlay body an effective anti-tipping distance and when said overlay is attached to said attachment rod member said anti-tipping means is adapted to be in slideable contact with said rail for preventing said overlay from pivoting about said attachment rod member out of the plane of said belt while said overlay travels through said transport section; and, optionally, if said belt is to travel through an arcuate path about an axis parallel to the plane of said belt or through a vertical path, anti-rotation means depending from said body for preventing said overlay from pivoting about said attachment rod member while travelling through said arcuate path or said vertical path;

said leading edge of said upper overlay surface lying forwardly of said opening in said rod member engaging means;

said trailing edge of said upper overlay surface lying rearwardly of a trailing rod member while in said transport section and said rod members are parallel to each other;

wherein said plurality of rib members are oriented relative to said backbone member to allow interdigitation thereof with rib members of overlays immediately ahead and behind said overlay on said belt.

In another aspect of the invention, there is provided in a conveyor system having at least one ware transport section and made up of a succession of overlays for transporting articles, each overlay having an overlay body providing an upper overlay surface with leading and trailing edges and upon which said articles are supported, each overlay being supported and moved along by a belt of spaced rod members extending transversely of the direction of travel of said belt which slides upon at least one rail, the improvement comprising in combination:

forward support means depending from said overlay body for supporting said overlay body on said spaced rod members;

said forward support means including a rod member engaging means operable to receive an attachment rod member when said overlay body is moved relatively toward said attachment rod member in a direction normal to said upper overlay surface;

said rod member engaging means including at least one pair of spaced resilient legs depending from said overlay body and each of said at least one pair of legs providing an opening for receiving said attachment rod member;

holding and bearing means in said opening on each pair of said legs for holding said attachment rod member received in said opening with a snap fit and providing bearing support for loads transmitted through said forward support means;

an anti-tipping means depending from said overlay body an effective anti-tipping distance and in slideable contact with said rail for preventing said overlay from pivoting about said attachment rod member out of the plane of said belt while said overlay travels through said transport section; and, optionally, if said belt is to travel through an arcuate path about an axis parallel to the plane of said belt or through a vertical path, anti-rotation means depending from said body for preventing said overlay from pivoting about said attachment rod member while travelling through said arcuate path or said vertical path;

said leading edge of said upper overlay surface lying forwardly of said opening in said rod member engaging means;

said trailing edge of said upper overlay surface lying rearwardly of a trailing rod member while in said transport section and said rod members are parallel to each other;

said overlay body comprising
 a backbone member extending transversely of the direction of travel of said belt when said overlay is installed, and
 a plurality of rib members attached to said backbone member, said rib members being substantially parallel to each other and transversely spaced from each other, each of said rib members having an upper rib surface and a rib leading edge and a rib upper trailing edge which define said upper overlay surface and said leading and trailing edges of said overlay body, respectively, wherein said plurality of rib members are oriented relative to said backbone member to allow interdigitation thereof with rib members of overlays immediately ahead and behind said overlay on said belt.

"Attachment rod member" is a term relative to a particular overlay and refers to the rod member to which the forward support means of this overlay is attached to.

"Trailing rod member" is a term relative to a particular overlay and refers to the rod member immediately behind the attachment rod member relative to the direction of travel by the conveyor belt.

The overlay has a backbone member positioned and extending transversely of the direction of travel of the belt, i.e., parallel with the axis of the attachment rod member to which the forward support means is removably attached, and a plurality of rib members attached to the backbone member. The rib members are substantially parallel to each other and transversely spaced from each other. Each of the rib members has an upper rib surface, a rib leading portion with a rib leading edge, and a rib upper trailing portion with a rib upper trailing edge which define the upper overlay surface and the leading and trailing portions and edges of the overlay, respectively. The plurality of rib members oriented on each overlay is oriented relative to their respective backbone and transversely spaced from each other to allow interdigitation thereof with rib members of other overlays immediately ahead and behind of said overlay when these other overlays are transversely staggered relative thereto.

The forward support means preferably includes a vertical slot which is slip-fitted over the attachment rod member and pressed down in a preferred embodiment to provide a snapped-in-position non-friction fit with the attachment rod member. The forward support means is fabricated and affixed to the overlay in such a way that the opening of the vertical slot in the forward support means makes contact with the attachment rod member, and as further pressure is applied downwardly to the overlay, the vertical slot is non-frictionally fitted and snapped into position over the attachment rod member. Attachment is therefore quite simple because the overlay is essentially self-positioning, no tools are required, and the vertical slot is so constructed that hand pressure is sufficient to achieve the desired non-friction fit.

In a preferred embodiment in which the conveyor system includes at least one rail whose top surface is below and parallel to the belt in the transport sections, the anti-tipping means comprises at least one anti-tipping rib member. The at least one anti-tipping rib member comprises a portion of the plurality of rib members. Preferably, each of the anti-tipping rib members has one of the forward support means. The rib leading portion of the anti-tipping rib member has a bottom surface which rides on the top surface of the at least one rail. The rib leading edge thereof extends an effective anti-tipping distance measured from the line of total downward force on the respective anti-tipping rib member. This distance is at least equal to the distance obtained by multiplying the coefficient of friction at the top surface of the rail with the vertical distance from the top surface of the rail to the centerline of the attachment rod of the respective overlay. The foregoing anti-tipping rib member design assumes an upward tipping tendency of the rib upper trailing edge. If there were a downward tipping tendency of the rib upper trailing edge, the rib lower trailing portion would extend rearwardly such that the rib lower trailing edge does not lead the line of downward force by more than the distance calculated as the product of the coefficient of friction at the top surface of the rail and the vertical distance from the top surface of the rail to the centerline of the rod to which the respective overlay is attached. The rib rearward bottom surface would be in slideable contact with the top surface of the at least one rail.

If the afore-mentioned conveyor system also has at least one arcuate path about an axis parallel to the plane of the belt or at least one vertical path, the overlay also includes anti-rotational means for preventing the overlay from pivoting about the attachment rod member while travelling through such an arcuate path or a vertical path. In one preferred embodiment, the anti-rotational means comprises at least one anti-rotation arm. The at least one anti-rotation arm extends rearwardly preferably from the backbone member.

The at least one anti-rotation arm is vertically spaced from and preferably parallel to the upper trailing portions of the plurality of ribs and defines a horizontal slot therebetween when the overlay is viewed in a side elevation. The vertical distance between the upper surface of the at least one anti-rotation arm and the plane of the lower surfaces of the upper trailing portions of the plurality of ribs is at least equal to, and preferably slightly greater than, the diameter of a rod member. The rib upper trailing portions and the at least one anti-rotation arm extend rearwardly of a trailing rod member which is slidably engaged thereby when the rod members are parallel to each other. Thus, the trailing rod member is between the rib upper trailing portions and the at least one anti-rotation arm which keeps the overlay from pivoting about the attachment rod member when the belt negotiates an arcuate path about an axis parallel to the plane of the belt or negotiates a vertical path. If the belt travels through such an arcuate path with the upper overlay surface being on a shorter radius path than the rod members, the rib upper trailing portions may extend rearwardly past the trailing rod member to a point intermediate of the trailing rod member and the next succeeding rod member so as to prevent binding of the belt since in such a path no three rod members are coplanar.

Additionally, the forward support means and the at least one anti-rotation arm are located in different vertical zones or planes, so that the forward support means of one overlay, and the anti-rotation arm(s) of an adjacent overlay may engage the same rod member, thereby allowing interdigitation of the rib leading portions of one overlay and the rib upper trailing portions of a second overlay without having these two overlays binding on one another when travelling through an arcuate path about an axis parallel to the plane of the belt.

To install such an overlay, the rib upper trailing portions are positioned so as to rest upon the trailing rod member. The overlay is then slid toward the trailing rod member such that the trailing rod member is slip-fitted between the rib upper trailing portions and the at least one anti-rotation arm. The overlay is then rotated downwardly around the trailing rod member acting as a pivot point. As the overlay is rotated, the opening of the vertical slot in the forward support means makes contact with the attachment rod member. As further pressure is applied downwardly to the overlay, the vertical slot is snapped into position over the attachment rod member.

However, if the afore-mentioned conveyor system has at least one arcuate path about an axis parallel to the plane of the belt and/or at least one vertical path and the at least one rail also has an arcuate path concentric with that of the belt and/or a vertical path, respectively, such that the distance between the rod members of the belt and the rail is maintained through the entire path, the anti-tipping rib members serve as both the anti-tipping means and the anti-rotational means in cooperation with the rail in another preferred embodiment. As such, the at least one anti-rotational arm is not required, but is optional, in this preferred embodiment. To install these overlays, the vertical slot is just placed over the corresponding attachment rod member and snapped into place by using downward pressure on the overlay.

In accordance with another aspect of the invention, the forward support means includes resilient legs which separate when the forward support means is pressed downwardly onto its supporting rod member, to preferably provide a non-friction fit. A stress relief means may also be included at the end of the vertical slot so that as an overlay is attached or removed and the legs in the forward support means experience flexion, the stress at the end of the vertical slot is relieved to prevent failure.

In accordance with yet another aspect of the invention, a holding means is provided in the vertical slot to securely attach the attachment rod member and to maintain the upper surface of the overlay in a specific horizontal position when it is properly attached to the conveyor belt in cooperation with the rib upper trailing portions resting upon the trailing rod member.

Positioning means are also provided at the opening of the vertical slot so that in the event the rib upper trailing portion is not precisely in its proper position as the overlay is rotated and/or pressed downwardly during attachment, the positioning means centers the vertical slot over its corresponding attachment rod member making attachment quite simple.

As a result, a plurality of these cooperating overlays provides a grated horizontal surface formed by the interdigitation of the ribs of the overlays. Such a surface is non-tensioning and trap-free. The forward support means of each overlay is secured to its corresponding attachment rod member and the anti-tipping means and the anti-rotation means, if present, of each overlay do not hinder travel of the belt through an arcuate path in the plane of the belt which includes an arcuate path that is helical, through an arcuate path about an axis parallel to the plane of the belt or through a vertical path.

Additionally, the backbone member may protrude past the last rib member on either end of the overlay. The length of the protrusion may be varied to assist in positioning the overlays in a staggered position to promote interdigitation of the rib members thereof. The protrusions may be utilized to effect end to end connections of a plurality of overlays in a transverse direction to the belt along a particular attachment rod member. The end connections may be male and female correspondingly.

Having a single backbone member has the advantage that it can be easily severed so as to yield several shorter overlays from a single long overlay module. The backbone member preferably shares a flat bottom with the rib members thereof. This prevents rocking of overlays with respect to the rods as noted above with respect to the anti-tipping means.

Accordingly, these and other objects, features, and advantages of the present invention will become apparent to those skilled in the art, from a consideration of the following detailed description of preferred embodiments, wherein reference is made to the figures in the accompanying drawings.

IN THE DRAWINGS

DETAILED DESCRIPTION OF THE PREFERRED EMBODIMENTS

Figure 1:
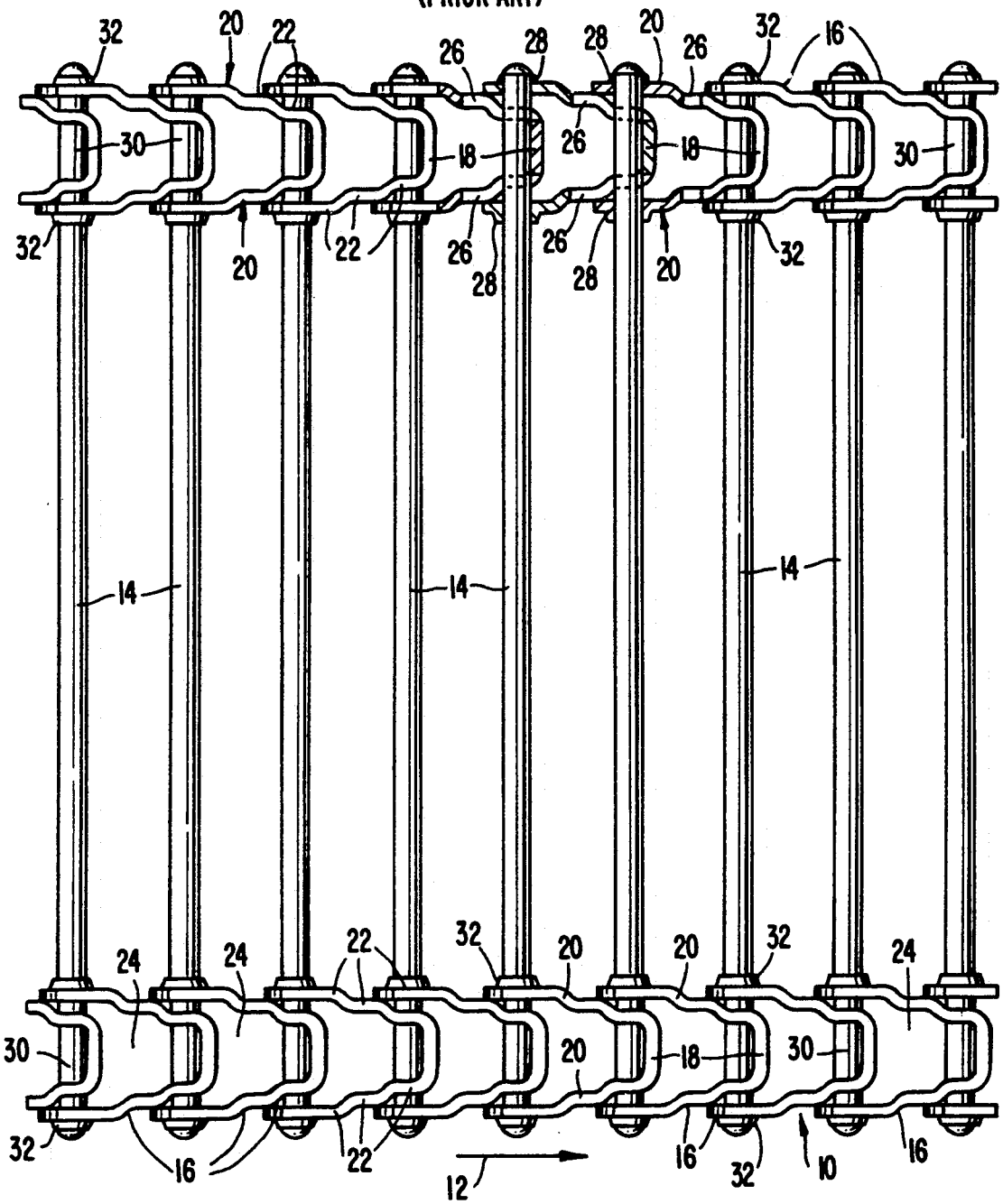
FIG. 1 is a top view of a conveyor belt of the spaced, transverse rod construction of a conveyor system.

In referring herein below to the various figures of the drawings, like reference numerals will be utilized to refer to identical parts and features of the devices shown therein.

Figure 2:
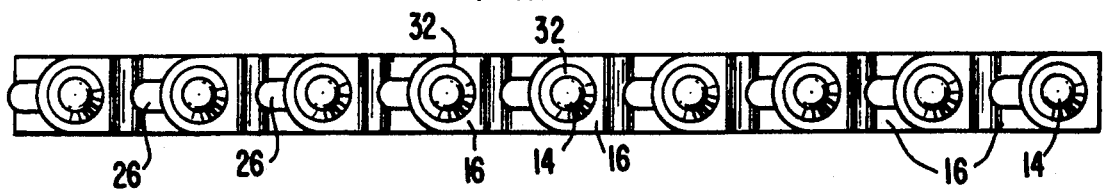
FIG. 2 is a side elevation of the conveyor belt shown in FIG. 1.

Referring now to the drawings, and more particularly to FIGS. 1 and 2, there is shown by way of illustration, but not of limitation, a conveyor belt 10 of the spaced, transverse rod construction. The conveyor belt 10 depicted is according to U.S. Pat. No. 3,325,898 to Roinestad, which is hereby incorporated by reference. As disclosed in pertinent part therein, the conveyor belt 10 includes a plurality of transverse rods 14 shown in FIG. 1 in their normally parallel, equally longitudinally spaced relationship extending transversely to the straight longitudinal direction of motion of the conveyor belt 10, as indicated by the arrow 12 in FIG. 1. For convenience of description, the orientation of the conveyor belt 10 as shown in FIG. 1 will be defined as lying in a horizontal plane and moving in a straight line path therein, although it will be appreciated that the plane of the belt 10 may be inclined at an angle relatively to a normally horizontal plane.

The rods 14 are slidably and pivotally interconnected at each of their ends by a plurality of generally U-shaped, stepped connecting links 16. Although in FIGS. 5-7, only a portion of the width of the belt 10 and thus only the rods 14 are shown, the connecting links 16 are to be understood to be arranged in a pair of spaced rows at opposite ends of the rods 14.

Each of the links 16 includes a straight base portion 18 having a pair of legs 20 rigidly connected to its outer ends. Each of the legs 20 has a plurality of stepped portions 22 to provide a spacing 24 within each of the links 16 which is relatively narrow at the base portion 18 and which becomes progressively wider at the opposite end thereof. The stepped portions 22 of each link are constructed substantially parallel to each other and to the direction of movement of the belt. Each of the links 16 includes, in the legs 20 thereof, a pair of aligned, elongated rod openings 26 adjacent the base 18 and a pair of generally circular, aligned rod openings 28 near their outer ends.

The connecting links 16 are arranged in partially nested or telescoped relationship with the inner, reduced width end 18 of each link 16 received between the wider end of the legs 20 of the respectively next succeeding link 16. Thus, the outer, more widely spaced ends of the legs 20 of each connecting link 16 overlap the base or inner end 18 of the adjoining link so that the rod openings 28 are aligned with the rod openings 26 of the preceding link. A rod 14 is received, at each of its opposite ends, through the aligned openings 26 and 28 of two adjoining links 16 and secured against withdrawal, such as by welding a shoulder 32 at the ends 30 of the rod 14 at each of the circular aligned rod openings 28. The shoulders 32 of each rod 14 secure the underlying leg 20 of its associated link 16 at each end 30 of the rod 14 to maintain the links 16 in fixed, spaced relationship. The rods 14 remain free to slide and to rotate within the slot 26 of the next preceding link 16. The links 16 therefore serve to pivotally and slidably interconnect the rods 14. The openings 24 within each link 16 provide a space between each rod 14 and the base 18 of an adjoining link 16 for receiving sprockets to permit the belt 10 to be driven.

Figure 7:
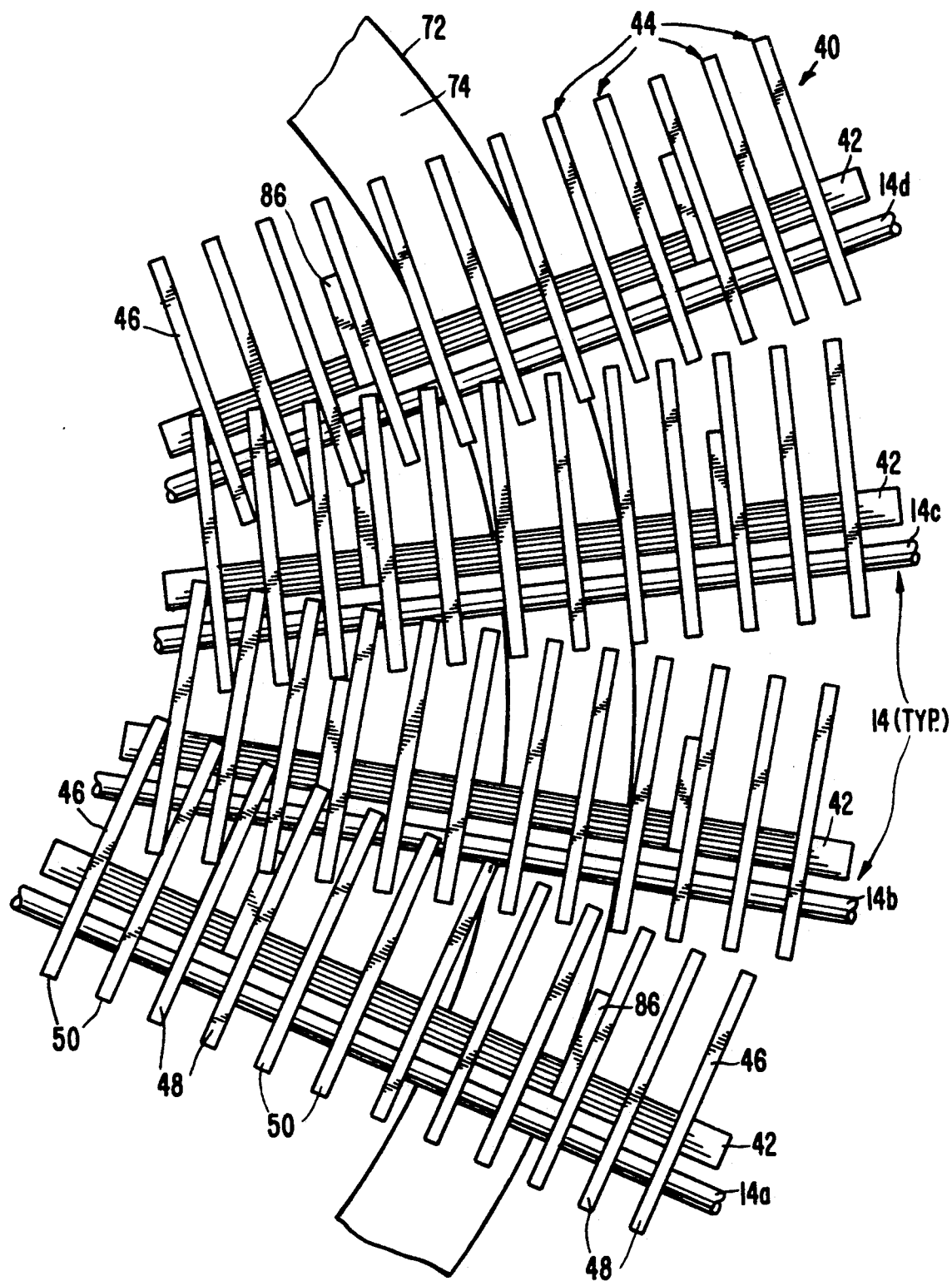
FIG. 7 is a top view of a portion of the conveyor belt shown in FIG. 5 negotiating an arcuate path in the plane of the conveyor belt.
Figure 12:
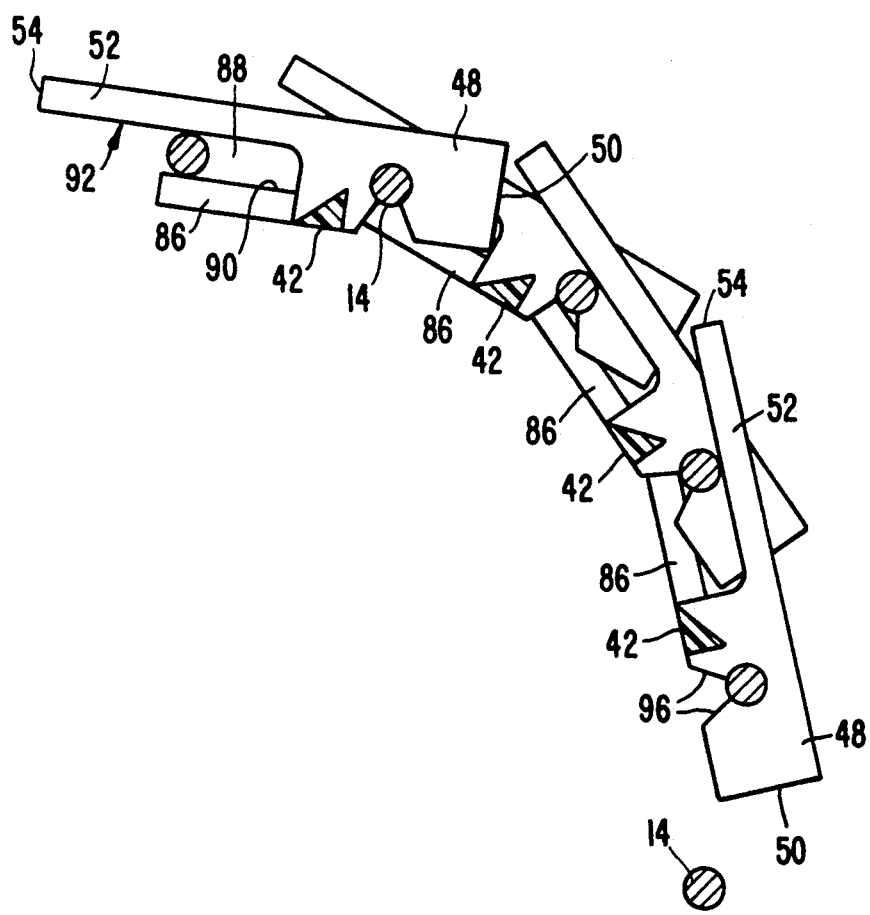
FIG. 12 is a side elevation partly in cross-section of the conveyor belt of FIG. 5 travelling through an arcuate path about an axis parallel to the plane of the conveyor belt.
Figure 13:
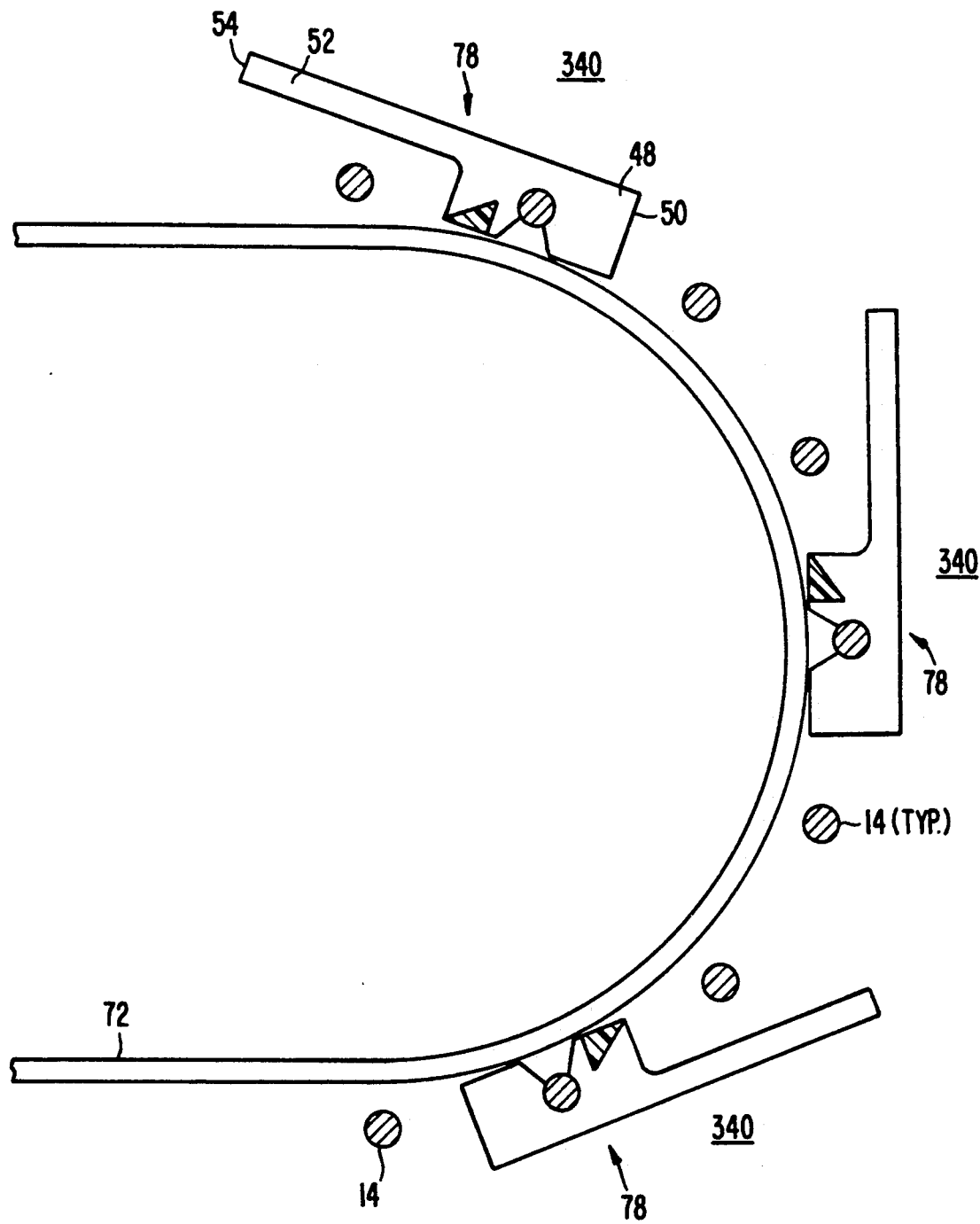
FIG. 13 is a side elevation partly in cross-section of a conveyor belt having a succession of overlays in accordance with the third embodiment having an anti-tipping rib member according to FIG. 11 travelling through an arcuate path about an axis parallel to the plane of the conveyor belt.

The interconnecting link construction of the belt 10 permits the belt to be driven through an arcuate path in the plane of the belt, as shown in FIG. 7. The arcuate path may also be defined as arcuate about an axis parallel to the plane of the belt 10, as shown in FIGS. 12 and 13. The elongated slots 26 permit the links 16 to nest more closely, thereby enabling one edge of the belt 10 to collapse. The rods 14 move from their normally parallel, evenly spaced relationship to an angular or diverging relationship when one edge of the belt 10 is collapsed, as shown in FIG. 7.

It is here again noted that the present invention is not limited to the foregoing type of collapsible rod and link conveyor system. For that member, the overlay of the present invention may be utilized on any conveyor system which utilizes parallel rod construction. The parallel rods may be fixed such that they are not collapsible or they may be interconnected at at least one of their ends to allow only one end to expand or collapse. Alternately, the overlays of the present invention may be utilized on a Small Radius Omni-Grid belt available from Ashworth Bros., Inc., Winchester, Va. In such a belt, there are three rows of links on each of the rod members. The inside and outside links are stepped links such as those described above; however, the outside links are larger because they negotiate a larger radius turn than the inside links through an edgewise arcuate path. This middle link on each rod is a straight sided link with circular holes therethrough to accommodate the rod members and acts as a pivot point for the rod members as the edgewise arcuate paths are negotiated by the belt.

Figure 3:
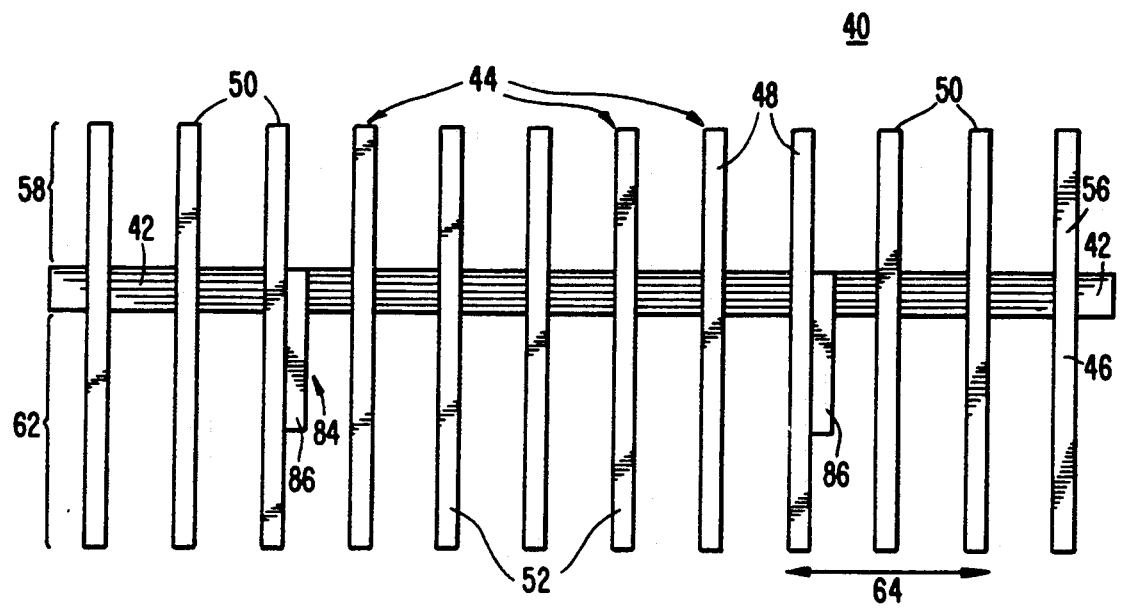
FIG. 3 is a top view of an overlay in accordance with a first embodiment of the invention prior to installation.
Figure 4:
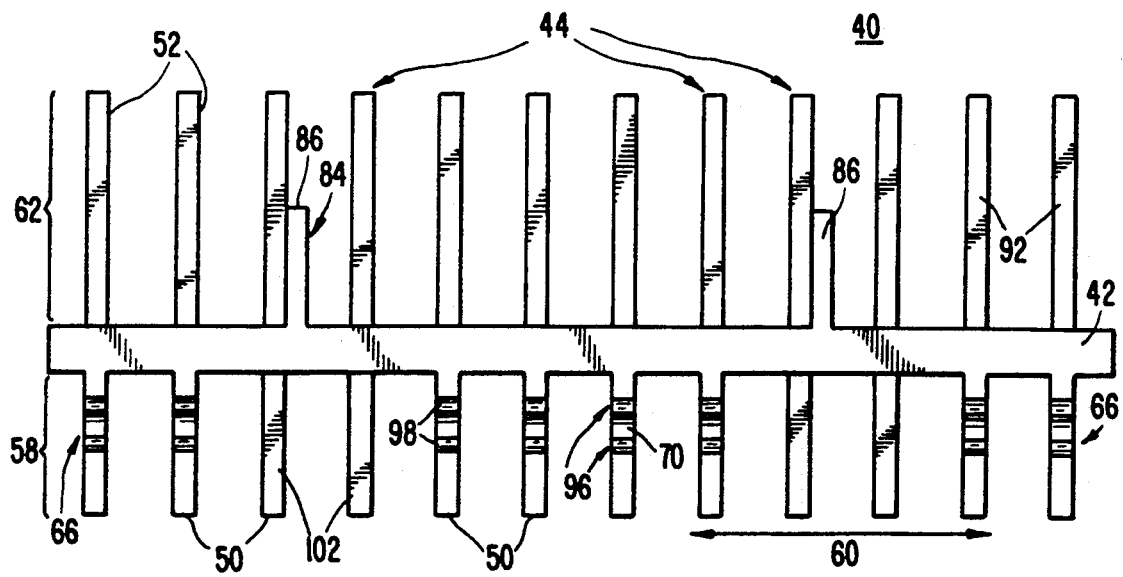
FIG. 4 is a bottom view of the overlay shown in FIG. 3.
Figure 5:
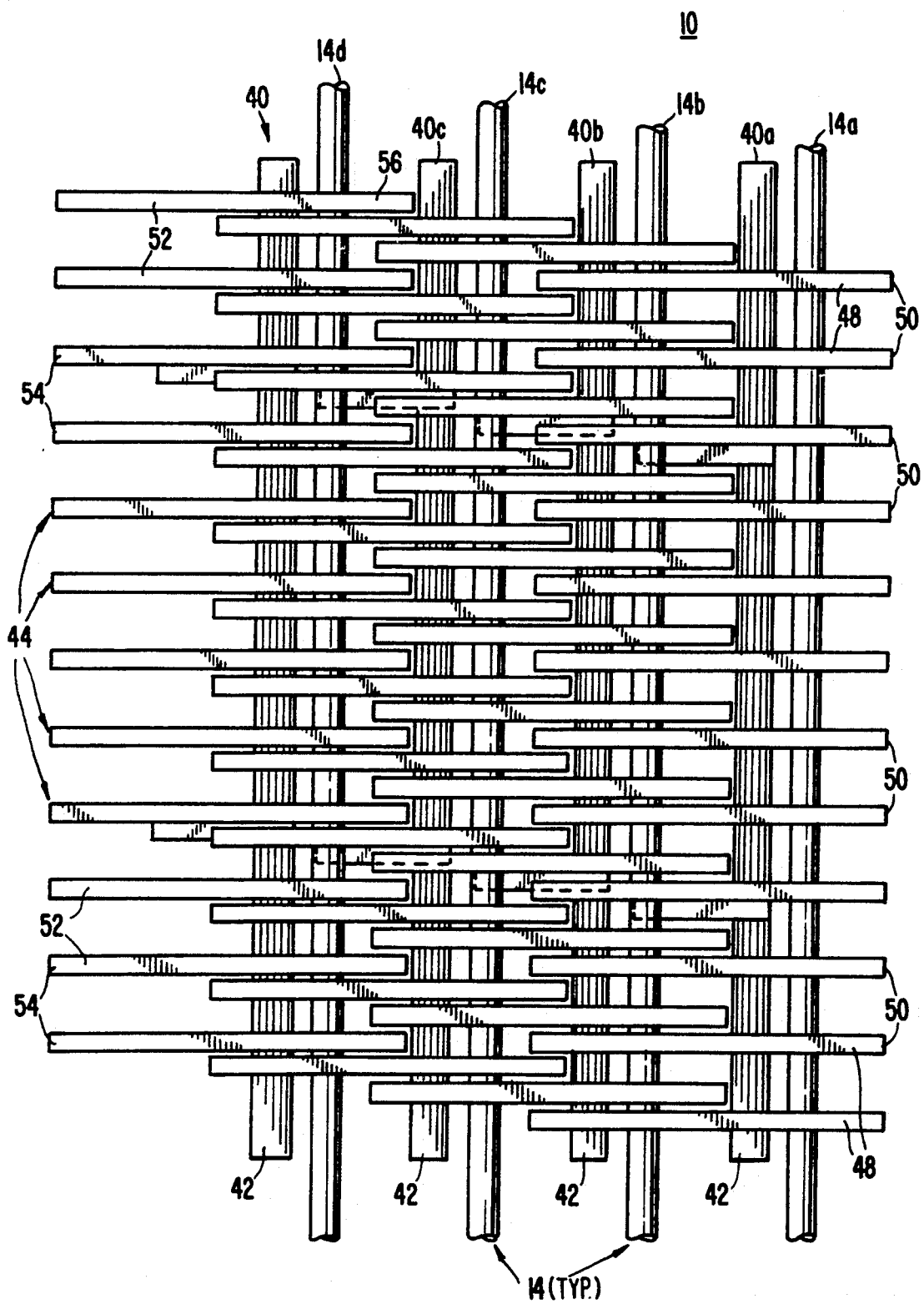
FIG. 5 is a top view of a portion of a conveyor belt of a conveyor system including a succession of the overlays shown in FIG. 2.
Figure 6:
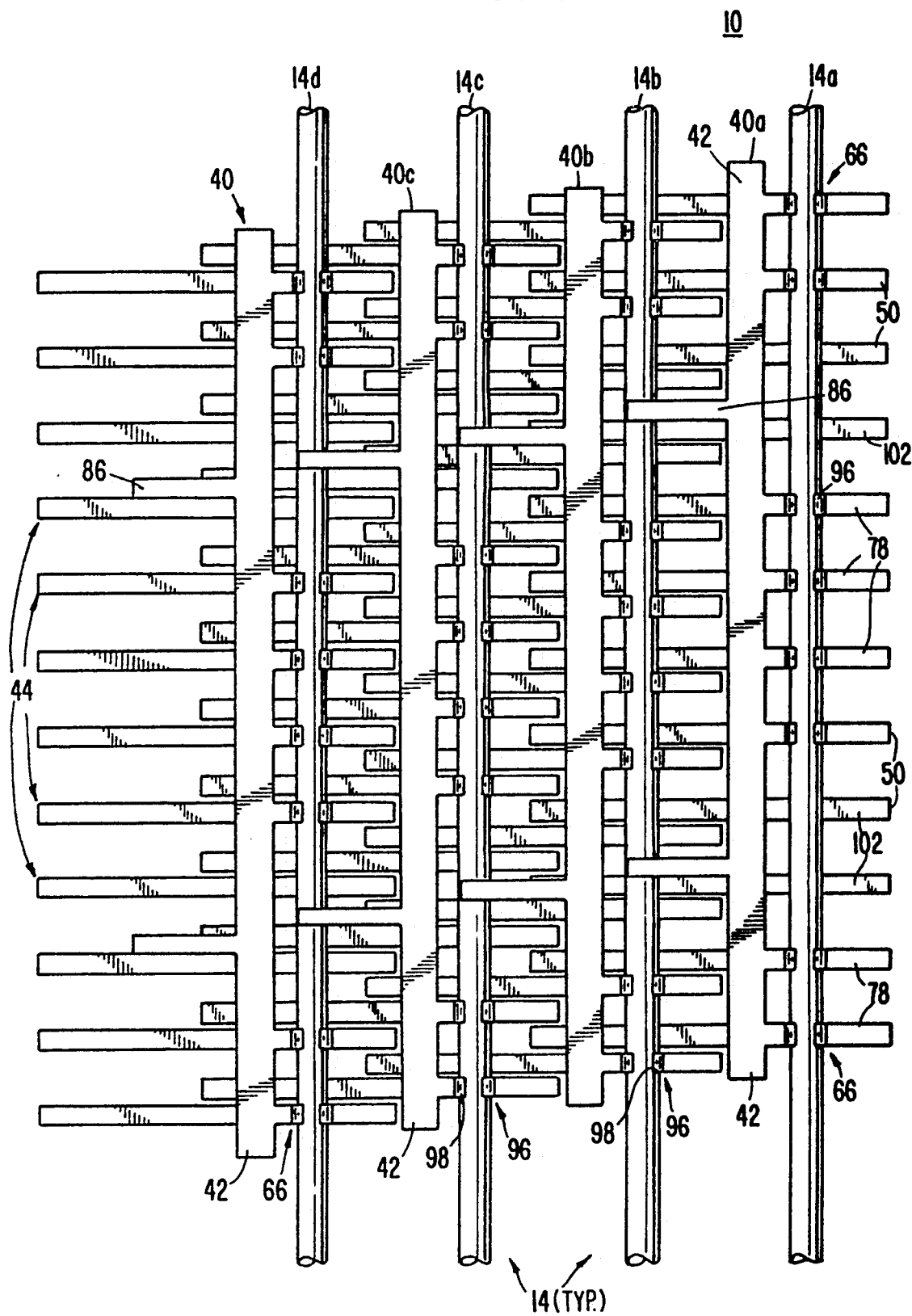
FIG. 6 is a bottom view of the portion of the conveyor belt shown in FIG. 5.

Referring now to FIGS. 3 through 6, there is shown an overlay 40 which is a non-tensioning, trap-free ware-support attachment for a collapsible rod and link conveyor system (not shown) having a belt 10 of spaced rods 14 extending transversely of the direction of travel of the belt 10. The conveyor system is made up of a succession of such overlays 40, as shown in FIGS. 5 and 6, for transporting articles. The overlay 40 has a backbone member 42 and a plurality of rod members 44 attached to the backbone member 42. Each of the rib members 44 has an upper rib surface 46, a rib leading portion 48 with a rib leading edge 50, and a rib upper trailing portion 52 with a rib trailing edge 54 which define the upper overlay surface 56, the overlay leading portion 58, the overlay leading edge 60, the overlay upper trailing portion 62, and the overlay trailing edge 64 of the overlay 40, respectively. The rib members 44 also have a rib lower trailing portion 130 with a rib lower trailing edge 132 with a rearward bottom surface 134.

The rib members 44 are substantially parallel to each other and transversely spaced from each other and preferably perpendicular to the main axis of the backbone member 42, such as is shown in FIGS. 3 and 4. Referring now to FIGS. 5 and 6, the plurality of rib members 44 of each overlay 40 is oriented relative to their respective backbone member 42 and transversely spaced from each other to allow inter-digitation thereof with rib members 44 of overlays 40a and 40c, immediately ahead and behind of said overlay 40b when overlays 40a and 40c are transversely staggered relative thereto (overlay 40b).

Figure 8:
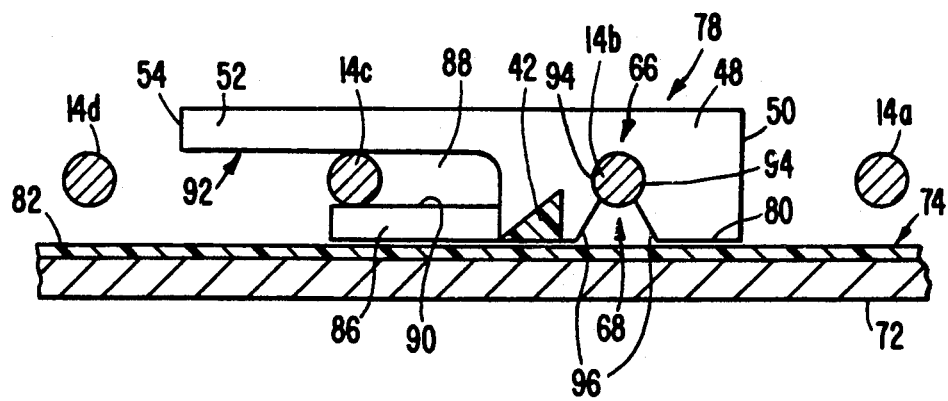
FIG. 8 is a side elevation of an anti-tipping rib member and an anti-rotation arm of the overlay shown in FIG. 3 with the backbone member thereof and the rods and rail of the conveyor system shown in cross-section.

The overlay 40 includes forward support means 66 for supporting the overlay leading portion 58 of the overlay 40 on the conveyor belt 10 as shown in FIGS. 5, 6 and 8. The forward support means 66 includes a vertical slot 68 for receiving and attaching to a rod 14, i.e., an attachment rod 14b. This is shown in FIG. 6 and in perspective view in FIG. 8 and 12. The forward support means 66 also includes resilient legs 94 which define in part the vertical slot 68 and which separate when the forward support means 66 is pressed downwardly onto its attachment rod 14b, to preferably provide a non-friction fit.

The vertical slot 68 includes holding means 70 for holding and bearing the forward support means 66 to the attachment rod 14b in the conveyor belt 10 and for supporting the overlay 40b on the attachment rod 14b. The holding means 70 shown clearly in FIG. 8 is a split part-circular surface or rounded detent which are part of the interior opposing surfaces of a pair of resilient legs 94, wherein the part-circular surface has the same or preferably a slightly larger cylindrical dimension than a rod 14 to assure a loose fit between the forward support means 66 and the attachment rod 14b and pivotally connect the overlay 40 thereto (14b). Additionally, the holding means 70 in cooperation with the rib upper trailing portions 52 resting upon a trailing rod 14c help to maintain the upper overlay surface 56 in a specific position relative to the horizontal position when it is properly attached to the conveyor belt 10 and the belt 10 is travelling through a transport section thereof. Preferably, the horizontal centerline of the horizontal slot 88 and the horizontal centerline of the holding means 70 are preferably the same distance from the upper overlay surface 56 for maintaining the overlay 40 in a horizontal plane as it is moved along by the conveyor belt 10 through a transport section thereof.

Positioning means 96 for positioning the vertical slot 68 over the attachment rod 14b prior to attachment thereto is shown in FIGS. 4 and 6 in a bottom view of the overlay 40 before and after attachment to the attachment rod 14b and in FIG. 8 in side view. In this preferred embodiment, the positioning means 96 are cam surfaces 98 located at the bottom of the vertical slot 68 which centers the vertical slot 68 and the holding means 70 located therein as the overlay 40 is rotated downward around the trailing rod 14c located in the horizontal slot 88. These cam surfaces 98 allow the overlay 40 to be attached quickly because great care need not be taken to position the overlay 40 with extreme accuracy. If, for example, the horizontal slot 88 is not completely slipped into place over the trailing rod 14c, the positioning means 96 will both center the vertical slot 68 over its corresponding rod member (the attachment rod) 14b and push horizontal slot 88 rearward onto its corresponding rod (the trailing rod) 14c.

Therefore, each overlay 40 pivotally engages its corresponding attachment rod 14b via the forward support means 66 and slidably engages its corresponding trailing rod 14c between the rib upper trailing portions 52 and the anti-rotation arm(s) 86. The rib members 44 of the overlays 40 are configured to allow interdigitation of the rib members 44 of overlays 40a and 40c, which are immediately ahead and behind of overlay 40b, with the rib members of overlay 40b by staggering these overlays relative to each other, as shown in FIGS. 5 and 6. Furthermore, as shown in FIG. 7, the overlays 40 may be telescoped into a more closely nested or collapsed relationship and also into a more expanded relationship, such as is required when the conveyor belt 10 passed through an arcuate path in the plane of the belt 10.

The pivotal relationship between successive overlays 40 is indicated in FIG. 12, wherein the conveyor belt 10 is being driven through the arcuate path about an axis parallel to the rods 14. In passing through the arcuate path, it will be appreciated that each overlay 40 is free to pivot about its respectively associated transverse rods, i.e., their corresponding attachment and trailing rods 14b and 14c, via the forward support means 66 and anti-rotation arm(s) 86, respectively. As is readily apparent from FIG. 12, no three rods 14 are coplanar when the belt 10 articulates in this manner. The rib leading portions 48 of overlay 40b must clear the backbone member 42 of overlay 40a as such an arcuate path is negotiated. Preferably, the backbone member 42 has an upper surface 100 which is angled upwardly from the rearward portion thereof to the forward portion thereof as is shown in FIG. 8. Additionally, the backbone member 42 is horizontally spaced from the vertical slot 68 at such a distance such that the anti-rotation arm 86 of an overlay 40b just clears the backbone member 42 of overlay 40c when the belt 10 is articulated in such a manner.

As shown in FIGS. 7 and 8, the conveyor system also includes at least one rail 72 whose top surface 74 is below and parallel to the belt 10 in the transport sections thereof. Due to the frictional forces and total downward forces acting upon the overlay 40, the overlay 40 also includes an anti-tipping means 76 which in the present preferred embodiment comprises at least one anti-tipping rib member 78. The at least one anti-tipping rib member 78 comprises a portion of the plurality of rib members 44. Each of the anti-tipping rib members 78 has one of the forward support means 66. The rib leading portion 48 of the anti-tipping rib member 78 has a rib leading bottom surface 80 which rides on the top surface 74 of the at least one rail 72. The rib leading edge 50 thereof extends an effective anti-tipping distance measured from the line of total downward force on the respective anti-tipping rib member 78. This distance is at least equal to the distance obtained by multiplying the coefficient of friction at the top surface 74 of the rail 72 with the vertical distance from the top surface 74 of the rail 72 to the centerline of the rod 14 to which the respective overlay 40 is attached. The foregoing anti-tipping rib member 78 design assumes an upward tipping tendency of the rib upper trailing edge 54. If there were a downward tipping tendency of the rib upper trailing edge 54, the rib lower trailing portion 130 would extend rearwardly such that the rib lower trailing edge 132 does not lead the line of downward force by more than the distance calculated as the product of the coefficient of friction at the top surface 74 of the rail 72 and the vertical distance from the top surface 74 of the rail 72 to the centerline of the rod 14b to which the respective overlay 40 is attached. The rib rearward bottom surface 134 would be in slideable contact with the top surface 74 of the at least one rail 72.

A conveyor belt, which is supported on and slidably mounted in a support and guide track, slides on rails having suitable wear strips of low friction material, such as nylon and ultra-high molecular weight polyethylene, and upstanding guides, with appropriate low friction strips. See FIG. 8 for cross-sectional side elevation of an anti-tipping rib member 78 on a rail 74 having a wear strip 82. The rails and guides maintain the belt in its desired configuration and yet permit ready movement of the belt, particularly through its turns. An example of such a conveyor belt is disclosed in U.S. Pat. No. 3,416,645, which is hereby incorporated by reference.

The afore-mentioned conveyor system also has at least one arcuate path about an axis parallel to the plane of the belt 10. To prevent the overlay 40 from pivoting about the attachment rod 14b while travelling through such an arcuate path, the overlay 40 also includes anti-rotational means 84 for preventing the overlay 40 from pivoting about the attachment rod 14b while travelling through such an arcuate path. In this preferred embodiment, the anti-rotational means 84 comprises at least one anti-rotation arm 86. The at least one anti-rotation arm 86 extends rearwardly preferably from the backbone member 42.

The at least one anti-rotation arm 86 is vertically spaced from and preferably parallel to the rib upper trailing portions 54 of the plurality of rib members 44 and defines a horizontal slot 88 therebetween when the overlay 40 is viewed in a side elevation, for example, as shown in FIG. 8. The vertical distance between the upper surface 90 of the at least one anti-rotation arm 86 and the plane of the lower surfaces 92 of the rib upper trailing portions 52 of the plurality of rib members 44 is at least equal to, and preferably slightly greater than, the diameter of a rod 14. As shown in FIG. 8, the rib upper trailing portions 52 and the at least one anti-rotation arm 86 extends rearwardly of a trailing rod 14c which is slidably engaged thereby when the rods 14 are parallel to each other. Thus, the trailing rod 14c is between the rib upper trailing portions 52 and the at least one anti-rotation arm 86 which keeps the overlay 40 from rotating about the attachment rod 14b when the belt 10 negotiates an arcuate path about an axis parallel to the plane of the belt 10, as shown in FIG. 12. When the belt 10 negotiates an arcuate path about an axis parallel to the plane of the belt 10, the anti-rotation arm 86 should not be so long as to engage another rod 14d rearward of the trailing rod 14c, or else the overlay 40 will bind the belt 10 since no three rods are coplanar on such in arcuate path, as shown in FIG. 12.

As such, the anti-rotation arm 86 may not be of sufficient length so as to maintain engagement with the trailing rod 14c when the belt 10 negotiates an edgewise arcuate path in the plane of the belt 10, as shown in FIG. 7. In such a situation, the anti-tipping means of the anti-tipping rib member 78 also helps to maintain the upper overlay surface 56 horizontal through such an edgewise arcuate path in cooperation with the rail 72.

Additionally, the forward support means 66 and the at least one anti-rotation arm 86 are located in different vertical zones or planes, so that the forward support means 66 of one overlay 40, and the anti-rotation arm(s) 86 of an adjacent overlay 40 may engage the same rod 14, thereby allowing interdigitation of the rib leading portions 48 of one overlay 40c and the rib upper trailing portions 52 of a second overlay 40b without having these two overlays binding on one another when travelling through an arcuate path about an axis parallel to the plane of the belt 10, as shown in FIG. 7.

Figure 9:
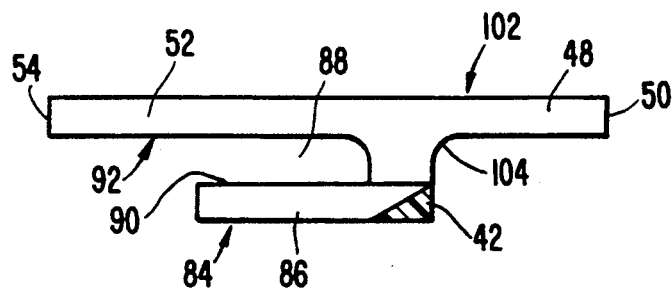
FIG. 9 is a side elevation of a support rib member and an anti-rotation arm of the overlay shown in FIG. 3 with the backbone member thereof shown in cross-section.

The rib members 44 which are not anti-tipping rib members 78 are support rib members 102. Referring now to the FIGS. 4 and 6 for a bottom view and FIG. 9 for a side elevation of such support rib members 102, the support rib members 102 do not have a forward support means 66, but rely on the forward support means 66 of the anti-tipping rib members 78 to securely attach same to the attachment rod 14b. The rib leading portion 48 thereof preferably extends downward no more than to the horizontal plane tangent to the upper most part of the attachment rod 14b and, therefore, have shallow rib leading portions 48. The anti-rotation arm(s) 86 of the overlay 40a ahead of overlay 40b are preferably located in the space between two anti-tipping rib members 78 on overlay 40b between which are positioned at least one support rib member 102. Since the support rib members 102 have a shallow rib leading portion 48, the overlays 40 may be more tightly inter-digitated with the limitation being that the anti-rotational arm(s) 86 of overlay 40a clear and not bind upon the rib leading portion 48 of the support rib members 102 of overlay 40b when negotiating an arcuate path about an axis parallel to the rods 14. The support rib members 102 also have a rib leading edge 50, a rib upper trailing portion 52 and a rib trailing edge 54. The support rib members 102 further includes a bearing surface 104 which makes contact with the attachment rod 14b when the overlay 40 is attached thereto (14b).

Attachment of this preferred embodiment of overlay 40 to a conveyor belt 10 is as follows. First, the rib upper trailing portions 52 are positioned so as to rest upon the trailing rod 14c and are slipped over the trailing rod 14c so that the rib upper trailing portions 52 and the anti-rotation arm(s) 86 slidably engage the trailing rod 14c therebetween, and then the overlay 40 is rotated downward around the trailing rod 14c which acts as a pivot point. FIG. 8 shows the cooperative relationship between the trailing rod 14c, rib upper trailing portions 52 and the anti-rotation arm(s) 86. As the overlay 40 is rotated downward, the vertical slot 68 contacts the attachment rod 14b, and as pressure is applied to the upper overlay surface 56 of the overlay 40, the forward support means 66 snaps into place with the holding means 70 securely fastened to the attachement rod 14b. The horizontal distance between the horizontal slot 88 and the vertical slot 68, including the holding means 70, is constructed to be no more than the distance between the rods 14 of commercially available conveyor belts 10.

Figure 10:
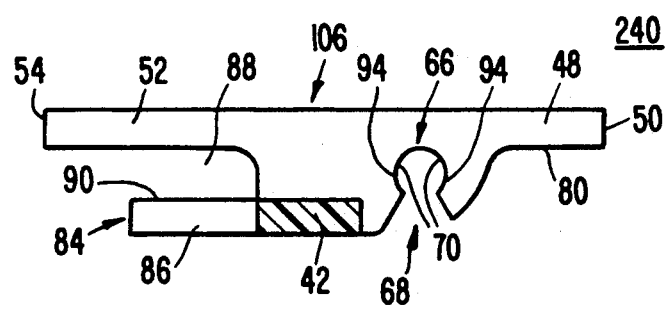
FIG. 10 is a side elevation of an attachment rib member and an anti-rotation arm of an overlay in accordance with a second embodiment of the invention with the backbone thereof shown in cross-section.

Referring now to FIG. 10, there is shown a side elevation of an attachment rib member 106 which is like the anti-tipping rib member 78 with the notable exception that the bottom surface 80 thereof in the rib leading portion 48 is not substantially on the same plane as the anti-rotation arm 86 thereof. Rather, the attachment rib member 106 has a shallow rib leading portion 48, much like the support rib members 102. Overlay 240 is like overlay 40 with the exception that attachment rib members 106 are utilized in lieu of the anti-tipping rib members 78 of overlay 40. Overlay 240 would be utilized when tipping forces are not encountered and at least one anti-rotation arm 86 can remain in contact with the trailing rod 14c through an arcuate path in the plane of the belt 10, if such paths are present.

Figure 11:
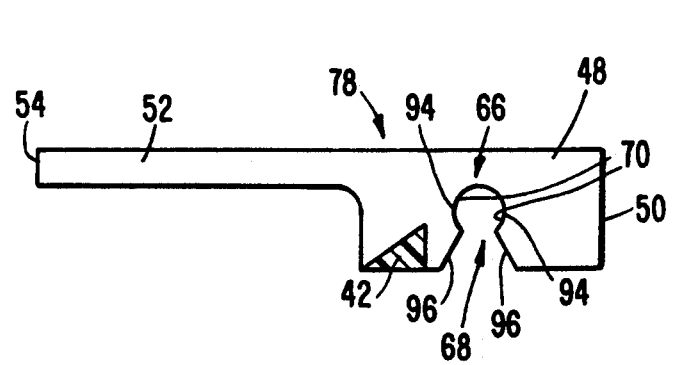
FIG. 11 is a side elevation of an anti-tipping rib member of an overlay in accordance with a third embodiment of the invention with the backbone thereof shown in cross-section (note the absence of the anti-rotation arm).

Referring now to FIGS. 11 and 13, if the afore-mentioned conveyor system has at least one arcuate path about an axis parallel to the plane of the belt 10 and no vertical paths and the at least one rail 72 also has an arcuate path concentric with that of the belt 10 such that the distance between the rod 14 of the belt and the rail 72 is maintained through the entire path, another preferred embodiment of the overlay may be utilized which denoted as overlay 340. Overlay 340 is like overlay 40 with the exception that overlay 340 does not require an anti-rotation arm 86. The anti-tipping members 78 in cooperation with the rail 72 serve as the anti-rotational means thereof. As such, the at least one anti-rotational arm 86 is not required, but is optional, in this preferred embodiment. To install overlays 340, the vertical slot 68 is just placed over the corresponding attachment rod 14b and snapped into place by using downward pressure on the overlay 340. FIG. 13 shows a vertical section of overlay 340, but only shows the anti-tipping members 78 in that same vertical plane.

Figure 14:
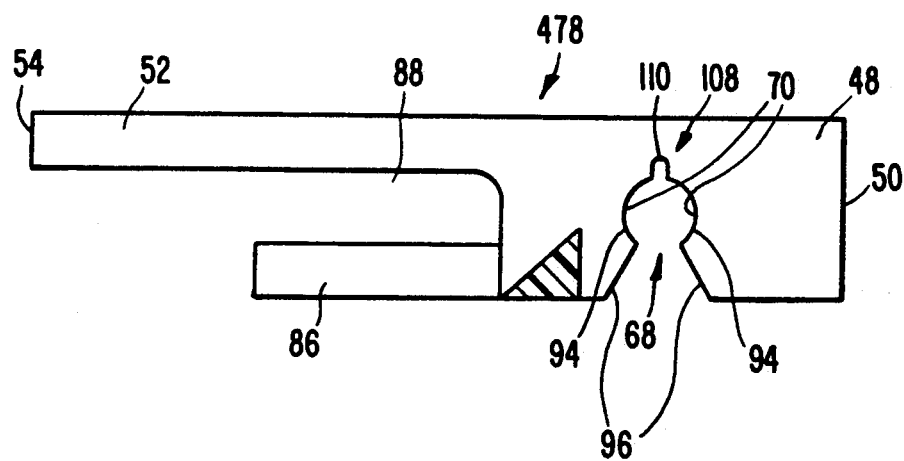
FIG. 14 is a side elevation of an anti-tipping rib member having stress relief means and an anti-rotational arm of an overlay in accordance with a fourth embodiment of the invention with the backbone member thereof shown in cross-section.

Referring now to FIG. 14, anti-tipping rib member 478 is similar to anti-tipping rib member 78 in FIG. 8, but further includes stress relief means 108 for relieving stress at the top end of the vertical slot 68. In this preferred embodiment, the stress relief means 108 is a hole 110 either machined or molded in the top end of the vertical slot 72. As the forward support means 66 is attached to or detached from the attachment rod 14b, the vertical slot 68 experiences a stress which would tend to be concentrated at the top end thereof. The stress relief means 108 distributes the stress in a manner to prevent failure at the top end of the vertical slot 68. With the stress relief means 108 at the end of the vertical slot 72, as an anti-tipping rib member 478 is attached or removed and the legs 94 in the forward support means 66 experience flexion, the stress at the end of the vertical slot 72 is relieved to prevent failure.

In summary, each overlay includes a upper overlay surface having an overlay leading portion with a leading edge and a trailing portion with a trailing edge and upon which articles are supported. The overlay is provided with a forward support means which are removably attached to an attachment rod member, an anti-tipping means for preventing the overlay from pivoting about the attachment rod member out of the plane of the belt while the overlay travels through the transport section of the conveyor system, and an overlay trailing portion which extends over a trailing rod member of the belt while in the transport section of the conveyor system and the rod members are parallel to each other. If the belt is to travel through an arcuate path about an axis parallel to the plane of the belt or through a vertical path, the overlay also includes anti-rotation means for preventing the overlay from pivoting about the attachment rod member while traveling through such an arcuate path.

An overlay constructed essentially as depicted in the drawings may be constructed by a unitary molding process without the necessity of drilling holes or milling slots or cutouts. The overlays may be constructed of a variety of plastics or fibers, and could also be made of metal with the forward support means, the anti-tipping means, the anti-rotation means and the additional features being welded or brazed together, or machined after initial castings or forging. The material chosen would depend upon the environment in which the overlays would be operating; differing materials being chosen if corrosive or reactive conditions might be present.

It is to be understood that the disclosed apparatus is merely illustrative of the principles of the present invention. Other advantages of the overlays of the invention will be readily apparent to those skilled in the art. The overlays are simple and inexpensive to manufacture, and may be made of any desired strength and size. The overlays are quickly and easily installed without the use of special tools or equipment, and without the use of any additional hardware, such as clips and the like. Further, one or more of the overlays may be quickly replaced, as where one becomes damaged, or where all the overlays on the conveyor belt are worn to an extent that it requires replacement.

It also will be understood that the overlay of this invention may be employed with various belt structures which may be designed to travel straight or curved paths or both. The invention is not restricted to the specific belt structure shown in the drawings. Accordingly, the scope of the present invention is to be determined in accordance with the appended claims.

We claim:

1. In a conveyor system having at least one ware transport section and made up of a succession of overlays for transporting articles, each overlay having an overlay body providing an upper overlay surface with leading and trailing edges and upon which said articles are supported, each overlay being supported and moved along by a belt of spaced rod members extending transversely of the direction of travel of said belt which slides upon at least one rail, the improvement comprising in combination:

forward support means depending from said overlay body for supporting said overlay body on said spaced rod members;

said forward support means including a rod member engaging means operable to receive an attachment rod member when said overlay body is moved relatively toward said attachment rod member in a direction normal to said upper overlay surface;

said rod member engaging means including at least one pair of spaced resilient legs depending from said overlay body and each of said at least one pair of legs providing an opening for receiving said attachment rod member;

holding and bearing means in said opening on each pair of said legs for holding said attachment rod member received in said opening with a snap fit and providing bearing support for loads transmitted through said forward support means; and an anti-tipping means forwardly depending from said overlay body an effective anti-tipping distance and in slideable contact with said rail for preventing said overlay from pivoting about said attachment rod member out of the plane of said belt while said overlay travels through said transport section;

said leading edge of said upper overlay surface lying forwardly of said opening in said rod member engaging means;

said trailing edge of said upper overlay surface lying rearwardly of a trailing rod member while in said transport section and said rod members are parallel to each other;

said overlay body comprising
 a backbone member extending transversely of the direction of travel of said belt when said overlay is installed, and
 a plurality of rib members attached to said backbone member, said rib members being substantially parallel to each other and transversely spaced from each other, each of said rib members having an upper rib surface and a rib leading edge and a rib trailing edge which define said upper overlay surface and said leading and trailing edges of said overlay body, respectively, wherein said plurality of rib members are oriented relative to said backbone member to allow interdigitation thereof with rib members of overlays immediately ahead and behind said overlay on said belt.

2. The improvement to the conveyor system of claim 1, wherein the forward support means further comprises:

stress relief means between said bearing means and said upper overlay surface for relieving stress in said pair of legs.

3. The improvement to the conveyor system of claim 1, wherein said forward support means further comprises:

positioning means including at least one cam face on each of said at least one pair of legs for positioning said forward support means over said attachment rod member prior to attachment thereto.

4. The improvement to the conveyor system of claim 1, wherein said belt travels through an arcuate path about an axis parallel to the plane of said belt or through a vertical path and further comprising anti-rotation means depending from said body for preventing said overlay from pivoting about said attachment rod member while travelling through said arcuate path or said vertical path.

5. An overlay for use in a conveyor system having at least one ware transport section and made up of a succession of overlays for transporting articles, each overlay being supported and moved along by a belt of spaced rod members extending transversely of the direction of travel of said belt which slides upon at least one rail, said overlay comprising:

an overlay body providing an upper overlay surface with leading and trailing edges and upon which said articles are supported, said overlay body comprising a backbone member extending transversely of the direction of travel of said belt when said overlay is installed, and a plurality of rib members attached to said backbone member, said rib members being substantially parallel to each other and transversely spaced from each other, each of said rib members having an upper rib surface and a rib leading edge and a rib trailing edge which define said upper overlay surface and said leading and trailing edges of said overlay body, respectively;

forward support means depending from said overlay body for supporting said overlay body on said spaced rod members;

said forward support means including a rod member engaging means operable to receive an attachment rod member when said overlay body is moved relatively toward said attachment rod member in a direction normal to said upper overlay surface;

said rod member engaging means including at least one pair of spaced resilient legs depending from said overlay body and each of said at least one pair of legs providing an opening for receiving said attachment rod member;

holding and bearing means in said opening on each pair of said legs for holding said attachment rod member received in said opening with a snap fit and providing bearing support for loads transmitted through said forward support means; and an anti-tipping means forwardly depending from said overlay body an effective anti-tipping distance and when said overlay is attached to said attachment rod member said anti-tipping means is adapted to be in slideable contact with said rail for preventing said overlay from pivoting about said attachment rod member out of the plane of said belt while said overlay travels through said transport section;

said leading edge of said upper overlay surface lying forwardly of said opening in said rod member engaging means;

said trailing edge of said upper overlay surface lying rearwardly of a trailing rod member while in said transport section and said rod members are parallel to each other;

wherein said plurality of rib members are oriented relative to said backbone member to allow interdigitation thereof with rib members of overlays immediately ahead and behind said overlay on said belt.

6. The overlay according to claim 5, wherein the forward support means further comprises:

stress relief means between said bearing means and said upper overlay surface for relieving stress in said pair of legs.

7. The overlay according to claim 5, wherein said forward support means further comprises:

positioning means including at least one cam face on each of said at least one pair of legs for positioning said forward support means over said attachment rod member prior to attachment thereto.

8. The overlay according to claim 5, further comprising anti-rotation means depending from said body for preventing said overlay from pivoting about said attachment rod member while said belt travels through an arcuate path about an axis parallel to the plane of said belt or through a vertical path.

* * * * *